Oct. 18, 1932.  H. R. COOL  1,883,765
TOTALING DEVICE
Filed June 28, 1930
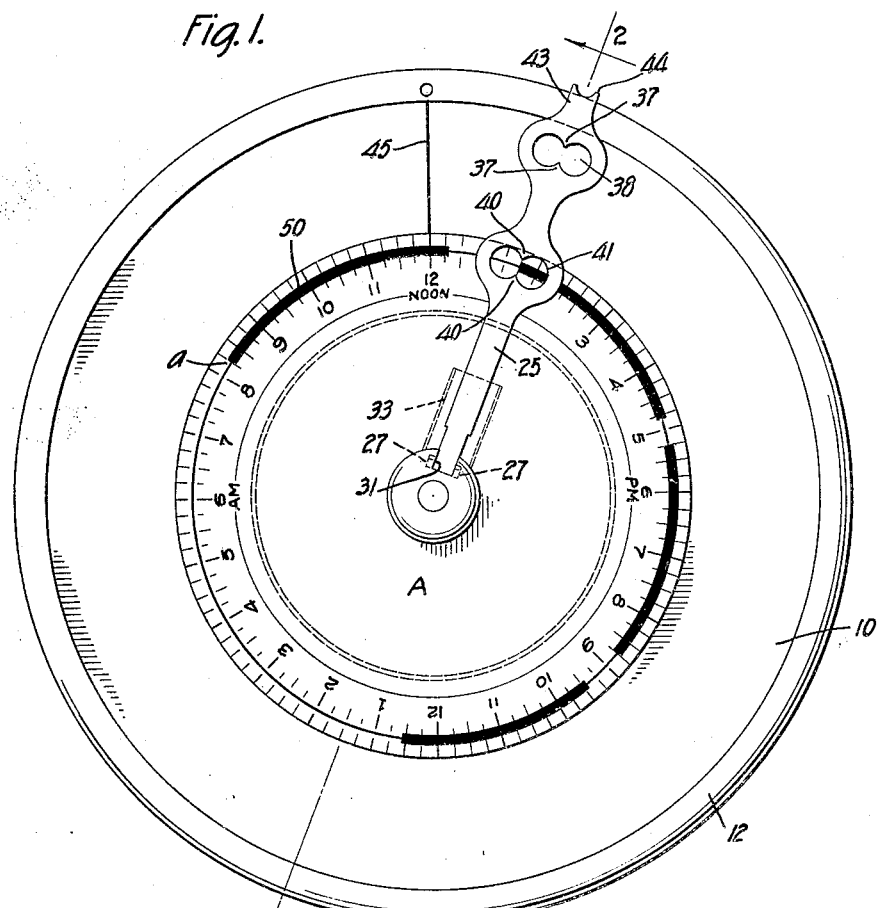
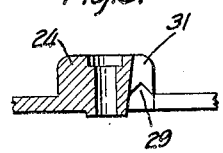
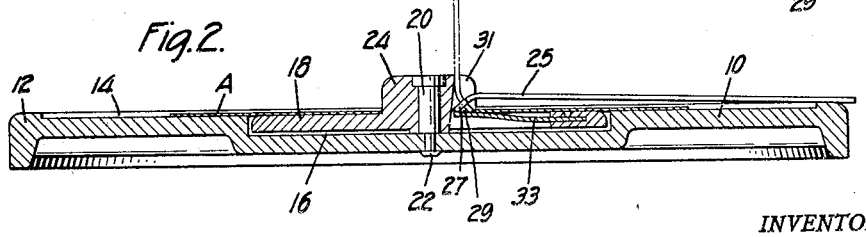
INVENTOR
Henry R. Cool.
BY Moses & Nolte
ATTORNEYS Patented Oct. 18, 1932

1,883,765

UNITED STATES PATENT OFFICE

HENRY R. COOL, OF CLEVELAND, OHIO, ASSIGNOR TO THE SERVICE RECORDER COMPANY, OF CLEVELAND, OHIO, A CORPORATION OF OHIO

TOTALING DEVICE

Application filed June 28, 1930. Serial No. 464,501.

My present invention relates to improvements in devices known as totalers which are of particular utility in connection with charts bearing markings made by a stylus of a recording device, as for example the device shown in my prior Patent No. 1,493,067. In a recording device of this type markings are made usually adjacent the periphery of a chart at various intervals during the period, usually 24 hours, over which the chart is used and it is frequently desirable that the total time during which said markings were made be ascertained.

My invention therefore has to do with a simple device by means of which this total may quickly be determined. In general, it is the object of the invention to improve existing types of chart totalers to the end that the chart may be easily and conveniently inserted and removed with respect to the device and also that charts of different sizes may be accommodated.

Other objects and advantages to be obtained will be apparent from the following description and the novel features will be pointed out in the appended claims.

In the drawing, Figure 1 is a view looking at the front face of the device;

Figure 2 is a sectional view taken along line 2—2 of Figure 1;

Figure 3 is a view in radial section showing the receptacle for containing the securing end of the indicating element.

The device comprises a plate 10 of suitable material as hard rubber or other plastic, and having preferably a rim 12 extending slightly above the chart receiving face 14 of the device. Plate 10 has preferably a circular depressed portion 16 to accommodate a chart holding member 18 which is mounted to turn about a pivot 20 secured in plate member 10 by means of a rivet portion 22. Member 18 is also comprised of a hub 24 receiving pivot 20 and which also carries a combination holding prong and indicator 25. Prong 25 is swingably secured to the hub 20 by means of ears 27, 27 which engage each within a cavity 29 in the hub 24 at either side of the slot 31. A leaf spring 33 is disposed within a cutout portion of the member 18 and bears against the slightly bent end of the prong 25 thus causing same to assume either a position against the rim 12, as shown in full lines in Figure 2 or vertically against hub 24 as shown by the dot and dash lines of that figure.

Indicator 25 has indicating portions, preferably two in number, comprising oppositely disposed cusps 37, 37 formed by the cut-out portion 38, and cusps 40 those formed by cut-out portion 41. A portion 43 preferably overlies the periphery of the plate 10 so as to provide a finger engaging portion 44. The face of plate 10 has marked thereon a radially extending line 45 to constitute a reference mark for the registry of a chart A which the device is adapted to receive. By virtue of the plural indicators formed by cut-out portions 38 and 41, either of two approximate sizes of charts may be totaled.

It is usually desired to record the total time as indicated by the heavy line 50 of the chart which, as will be seen, is apt to be interrupted at various points throughout the circumferential extent thereof. In placing the chart in place, the prong or indicator 25 is raised to its vertical position, the chart A (which is provided with a hole at the center thereof to accommodate the hub 24) is placed over this hub, and the indicator brought to horizontal position. One way of ascertaining the total is as follows: The chart is rotated so that twelve o'clock noon on the chart is directly opposite the line 45. The indicator 25 is then moved so as to point to the beginning *a* of the line 50. Holding the pointer stationary, the chart is then moved until the first section of the black line is traversed. Now, keeping the chart stationary, the pointer is moved again to the beginning of the next portion of the black line, which position is shown in the full lines of Figure 1, whereupon the rotation of the chart for the length of this section line is repeated. This procedure is kept up until all the black line 50 has moved past the pointer, whereupon the desired total time, in hours and minutes, may be read opposite the mark 45.

It will be evident from the foregoing that I have provided a chart holder and totaler which is characterized by several advantages, among which may be mentioned: the ease of inserting and removing the chart; the ease and accuracy of measurement by virtue of the fact that the pointer or indicator is substantially flush with the chart but on the other hand is in non-binding relationship therewith; and finally, the availability of the device for various sizes of charts.

I claim:

1. In a chart holding and totaling device, a plate member having a reference mark on its surface near its periphery, a hub rotatably mounted on said plate member, a pointer, means for securing same to said hub permitting a perforated chart to be placed over the hub and means for holding said pointer substantially flush against a chart upon said plate but in non-binding relation thereto and means for swinging said pointer to a chart receiving position, said mark on the plate member and said pointer being adapted to cooperate with the markings on the chart to enable the total of the indications on said chart to be read from the scale on the chart.

2. In a chart holding and totaling device, a plate member having a line extending from a point adjacent the periphery radially inward, together with a pointer having a plurality of indicating portions in radial alignment, means for rotatably mounting said pointer concentrically of said plate member including means for holding it substantially flush against a chart upon said plate but in non-binding relation thereto.

3. In a chart holding and totaling device, a plate member having a rim slightly elevated above the surface thereof, a pointer, a hub rotatably mounted on said plate, means for securing said pointer to said hub including means for springably holding same against said rim and permitting it to be moved into position to receive the chart over said hub.

4. In a chart holding and totaling device, a plate member having a depressed concentric portion and a radial reference mark on its surface outside of said depressed portion, a rotatable inset in said depressed portion and substantially flush therewith and having means for securing a chart in place comprising a hub carried by said inset and a pointer adapted to overlie the chart and means for hingedly securing the pointer to said hub, said securing means permitting said pointer to have a vertical position at rest and a horizontal securing position at rest.

In testimony whereof I have affixed my signature to this specification.

HENRY R. COOL.